(12) United States Patent
Ritter et al.

(10) Patent No.: US 11,577,711 B2
(45) Date of Patent: Feb. 14, 2023

(54) METHOD OF CONTROLLING A BRAKE FOR SERVICE OPERATION

(71) Applicant: AKEBONO BRAKE INDUSTRY CO., LTD, Tokyo (JP)

(72) Inventors: George Douglas Ritter, Royal Oak, MI (US); Xun Sun, Farmington Hills, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 190 days.

(21) Appl. No.: 17/192,206

(22) Filed: Mar. 4, 2021

(65) Prior Publication Data

US 2022/0281431 A1 Sep. 8, 2022

(51) Int. Cl.
  *B60T 17/22* (2006.01)
  *F16D 65/18* (2006.01)
  *F16D 121/14* (2012.01)
  *F16D 121/24* (2012.01)
  *F16D 125/40* (2012.01)

(52) U.S. Cl.
  CPC ............ *B60T 17/221* (2013.01); *F16D 65/18* (2013.01); *F16D 2121/14* (2013.01); *F16D 2121/24* (2013.01); *F16D 2125/40* (2013.01)

(58) Field of Classification Search
  CPC .... B60T 13/741; B60T 13/588; B60T 13/746; B60T 7/042; B60T 13/662; B60T 17/221
  See application file for complete search history.

(56) References Cited

U.S. PATENT DOCUMENTS

| | | | | |
|---|---|---|---|---|
| 4,014,414 A | * | 3/1977 | Yamamoto | B60T 17/226 192/85.37 |
| 6,311,808 B1 | * | 11/2001 | Halasy-Wimmer | B60T 11/105 188/68 |
| 7,134,533 B2 | * | 11/2006 | Hashida | F16D 65/18 188/72.4 |
| 7,635,050 B2 | * | 12/2009 | Yamamoto | F16D 65/54 188/73.1 |
| 8,370,039 B2 | * | 2/2013 | Bentner | B60T 7/107 701/70 |
| 8,430,213 B2 | * | 4/2013 | Yokoyama | F16D 65/18 188/71.7 |
| 9,835,213 B2 | * | 12/2017 | Li | F16D 65/18 |

(Continued)

FOREIGN PATENT DOCUMENTS

| JP | 4401800 B2 | 11/2009 |
|---|---|---|
| WO | 2010/0026327 A1 | 3/2010 |

OTHER PUBLICATIONS

Raybestos Brakes, How Electric Parking Brakes Work, Aug. 24, 2020, YouTube, https://www.youtube.com/watch?v=46KgDEyD0Pc&t=306s (Year: 2020).*

(Continued)

*Primary Examiner* — Jason L Vaughan
(74) *Attorney, Agent, or Firm* — The Dobrusin Law Firm, P.C.; Bryan S. Lemanski

(57) ABSTRACT

A method of servicing a brake system, comprising: (a) moving an actuator of the brake system from a first position to a second position; (b) conducting a manual operation on the brake system when or after the actuator reaches the second position; and (c) after completing the manual operation, moving the actuator to a third position.

19 Claims, 6 Drawing Sheets

(56) References Cited

U.S. PATENT DOCUMENTS

| 10,137,878 | B2 | 11/2018 | Ritter |
| 2016/0076609 | A1 | 3/2016 | Narula et al. |
| 2018/0038432 | A1 | 2/2018 | Blattert et al. |
| 2020/0263748 | A1 | 8/2020 | Ritter |
| 2021/0300310 | A1* | 9/2021 | Gerber ................. F16D 65/183 |

OTHER PUBLICATIONS

Aaron Hines, F-150 Brake Replacement + Electric Parking Brake Release Procedure, Jul. 19, 2018, YouTube, https://www.youtube.com/watch?v=Yxdv2skQel8 (Year: 2018).*

Co-pending U.S. Appl. No. 16/278,219, filed Feb. 18, 2019, Published as 2020/0263748.

European Extended Search Report dated Sep. 3, 2021, Application No. 21165569.1.

* cited by examiner

METHOD OF CONTROLLING A BRAKE FOR SERVICE OPERATION

FIELD

The present teachings generally relate to a brake system, and more particularly, to a method of controlling a brake system for service operation.

BACKGROUND

Parking brake systems are used in a variety of vehicles to prevent movement of a stopped or parked vehicle. In disc brake systems, the parking brake system may move a pair of opposing brake pads into engagement with a brake rotor to create a parking brake force. Similarly, in drum-in-hat brake systems, the brake system may move a pair of brake shoes radially outward against the drum portion of a brake rotor to create a parking brake force.

In some applications, parking brake systems are electromechanical systems that may include a motor and an actuator assembly for moving the brake pads or the brake shoes against the brake rotor or the drum portion of a brake rotor, respectively, to create the parking brake force. Some conventional parking brake systems may utilize a position sensor to determine a position of the actuator assembly and/or a position of one or more brake pistons to determine that the parking brake force has been created or released.

In addition to determining whether the parking brake force has been created or released, the parking brake system may also need to determine the position of the actuator assembly and/or a position of one or more brake pistons to complete service operations on the brake system. For example, the one or more brake pads within the brake system may require replacement. To replacement worn brake pads, the brake system may need to retract the one or more brake pistons to a service position and allow a service technician to remove the worn brake pads, whereby the service position is determined by the brake system. Unfortunately, the service position may extend beyond a typical release position during operation, thereby exposing the brake system to a potential fault condition, such as mechanical locking between one or more components of the brake system, an inability to return the one or more pistons to a standard running position, or both.

Thus, it may be desirable to have a brake system and/or control method for a service release operation that includes one or more operations prior to reaching a service position. What is needed is a brake system and/or control method that includes one or more intermediary positions during a service release operation that require manual interaction to prevent potential fault conditions. Additionally, it may be desirable to have a brake system and/or control method for determining one or more intermediary positions, a service release position, or both during a service release operation. What is needed is a brake system and/or control method that accurately determines such positions using control logic to determine the position of the actuator assembly, one or more brake pistons, a motor, or a combination thereof. Moreover, it may be desirable to have a more robust brake system and/or control method that actively detects any potential faults during a service release operation. What is needed is a brake system and/or control method that proactively detects potential faults prior to a system failure causing the brake system to be inoperable.

SUMMARY

The present teachings meet one or more of the present needs by providing a method of servicing a brake system, comprising: (a) moving an actuator of the brake system from a first position to a second position; (b) conducting a manual operation on the brake system when or after the actuator reaches the second position; and (c) after completing the manual operation, moving the actuator to a third position.

The present teachings also meet the present needs by providing a method of servicing a brake system, wherein in a first position one or more brake pads of the brake system may be free of contact with a rotor of a vehicle. In the first position one or more brake pads of the brake system may be in contact with a rotor of a vehicle. The second position may be a position of the actuator located between the first position and the third position. The manual operation may also comprise manually retracting a brake piston into a caliper bore. Additionally, the actuator may be stationary during the manual operation. Furthermore, step (a) may be manually initiated by a user.

The present teachings may also provide a method of servicing a brake system, wherein the actuator may be moved with an electric motor during step (a), step (c), or both. The actuator may comprise a spindle and a nut or a ball screw, and the third position may be when the nut contacts a spindle stop of the spindle. Additionally, the nut may be free of contact with the spindle stop in the second position. Moreover, the brake piston may remain stationary during step (c). Furthermore, during step (a), one or more components of the actuator may be moved away from a brake piston of the brake system. In addition, the third position may be farther away from the first position than the second position. The third position may be when the nut is moved farther away from a brake piston than when the nut is in the second position.

The method of servicing a brake system may also include a step of inspecting, replacing, or both one or more brake pads of the system. The method may also include a step of monitoring the brake system during the servicing for a fault. The method may further include a step after moving the actuator to the third position to move the actuator back to the first position, a brake position where one or more brake pads of the brake system are in contact with a rotor of a vehicle, or both.

The present teachings may also meet one or more of the present needs by providing a method of servicing a brake system, comprising: (a) moving an actuator of the brake system from a first position to a second position; (b) upon indication of the actuator moving to the second position, manually retracting a piston of the brake system in a caliper bore; (c) after the manually retracting step, moving the actuator to a third position farther away from the first position than the second position; and (d) moving the actuator from the third position to a parked position, whereby one or more brake pads of the brake system are in contact with a rotor of a vehicle, wherein fault detection is conducted during steps (a)-(d). The first position may be the parked position. Additionally, inspection or replacement of the one or more brake pads may be completed after step (c), but before step (d).

The teachings herein may provide a brake system and/or control method for a service release operation that includes one or more operations prior to reaching a service position. The brake system and/or control method may include one or more intermediary positions during a service release operation that require manual interaction to prevent potential fault conditions. The brake system and/or control method may determine one or more intermediary positions, a service release position, or both during a service release operation. The brake system and/or control method may accurately determine such positions using control logic to determine the position of the actuator assembly, one or more brake pistons, a motor, or a combination thereof. Additionally, the brake system and/or control method may actively detect any potential faults during a service release operation and may proactively detect potential faults prior to a system failure that may cause the brake system to be inoperable.

DETAILED DESCRIPTION

Figure 1:
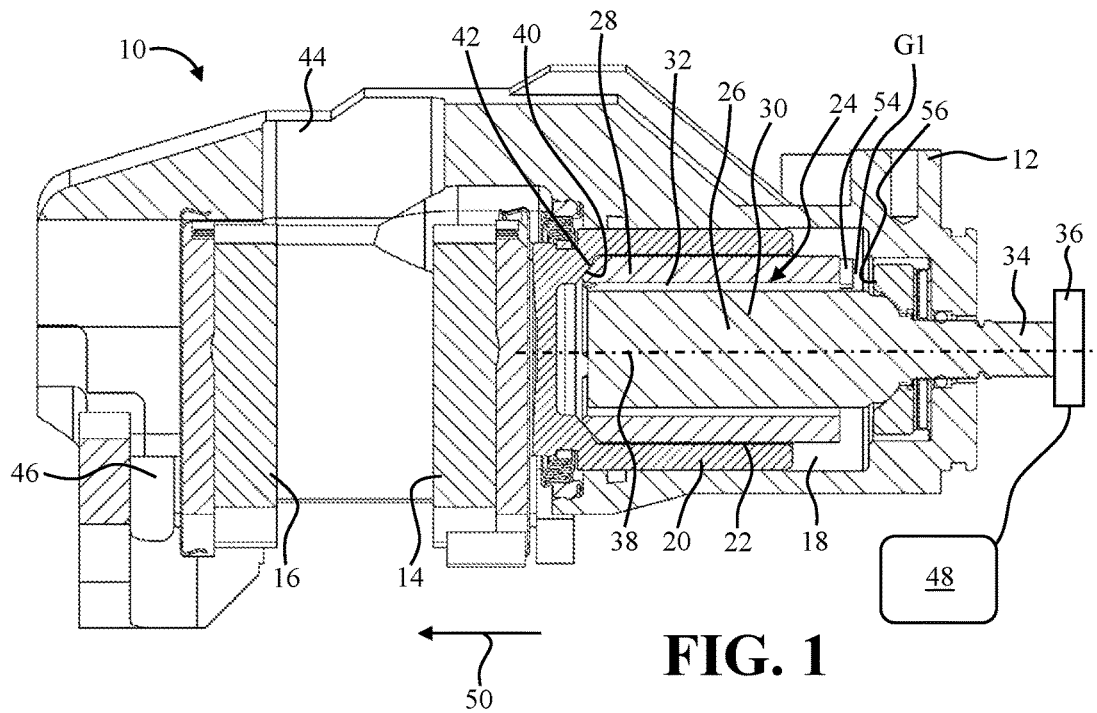
FIG. 1 is a cross-section of a brake system that includes an actuator in an extended position.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The method of servicing a brake system described herein may pertain to a brake system or brake assembly configured to create a clamping force. The brake system may function to, may be configured to, or may be adapted or enabled to create a clamping force to slow, stop, and/or maintain a vehicle in a stopped position. The brake system may be an opposing brake system (i.e., a fixed caliper brake system) or a floating brake system (i.e., a floating caliper). The brake system may be a disc brake system. The brake system may be a drum brake system and/or a drum-in-hat brake system. The brake system may be a service brake system. The brake system may be a parking brake system. The brake system may be a combined service and parking brake system. The brake system may be used in motor vehicles, like sedans, pick-up trucks, high performance vehicles, motorcycles, all-terrain vehicles, and the like.

The brake system may be used in non-vehicular applications, like amusement park rides, paper mill winders, lathes, and the like.

The clamping force may be a force that, when coupled with a brake pad coefficient of friction, functions to decelerate, slow, stop, and/or prevent movement or rotation of a brake rotor, road wheel, and/or a vehicle. The clamping force may be created during a standard or service brake apply. The clamping force may be created during a parking brake apply.

One or more brake pads may be used to create the clamping force. The clamping force can be created by converting the kinetic energy of the vehicle into thermal energy by frictionally engaging the friction material of one or more brake pads with one or more sides of the brake rotor. The one or more brake pads may include one or more features (i.e. ears, projections, etc.) that may engage or be engaged by a brake caliper, a support bracket, or both to maintain the location of the brake pads within the brake system and relative to the brake rotor.

The brake caliper may function to support one or more the components of the brake system. For example, the brake caliper may include one or more supports configured to engage and/or support the one or more brake pads. The brake caliper may include one or more mounting locations for the motor to be mounted or connected to the brake caliper. The brake caliper may provide for one or more brake pads, or, preferably, two or more brake pads to move relative to the brake rotor. The brake caliper may be connected to any non-rotating or moving part of a vehicle, like a support or a knuckle or frame.

The brake caliper may have one or more caliper bores configured to receive and support a brake piston. As such, the brake piston may be in communication with, at least partially receive, or both an actuator. The brake piston may be moved by the actuator in an apply direction during a brake apply, a parking brake apply, or both to create a clamping force. Similarly, to release the clamping force, the brake piston can be moved by actuating the actuator in an opposing release direction.

It is envisioned that the actuator may beneficially include a hard stop between a spindle and a nut assembly of the actuator to prevent actuation of the actuator beyond a desired position, thereby helping to prevent unwanted disengagement between the brake piston and the actuator. Such a desired brake assembly, including the actuator and brake piston described herein, can be found in U.S. patent application Ser. No. 16/278,219, filed on Feb. 18, 2019, published as US Publication No. 2020/0263748, all of which is incorporated herein for all purposes.

The method of servicing a brake system described herein may beneficially actuate the brake system to a service release position, whereby a user (e.g., a service technician) may access one or more components of the brake system (e.g., brake pads, brake lining, brake caliper, etc.) with sufficient clearance. The service release position may be a complete released position of a brake assembly where the actuator of the brake assembly is in a fully retracted position. However, it should be noted that movement of the actuator to a fully released position may increase the risk of disengaging the brake piston from the actuator, or more particularly a nut assembly of the actuator that abuts the brake piston, which may result in a non-functional state of the brake assembly. To combat such a failure mode, the present teachings may beneficially provide one or more incremental positions during a service release operation that facilitate manual interaction with the brake assembly by a service technician to prevent the disengagement between the brake piston and the actuator nut.

As mentioned above, the brake assembly may be moved to one or more positions during the method described herein. The positions may include an open position, an incremental released position, a complete released position, a running position, a brake apply position, or a combination thereof.

As such, the brake system or a controller thereof may need to determine the one or more positions of the brake assembly to determine a state of the brake assembly within the system, as further described below. To determine such a position, the brake system or a controller thereof may utilize position estimation based upon one or more parameters of the brake system or brake assemblies thereof, such as current, voltage, time durations, or a combination thereof. Position estimation used herein is described in U.S. Pat. No. 10,137,878, all of which is incorporated herein for all purposes.

The controller of the brake system may include or be in communication with a control module, control logic, a linear time variant observer (LTV), or a combination thereof. The control module, control logic, LTV, or a combination thereof may be used to estimate a position of the motor, a position of the spindle, a position of the nut, a position of the actuator assembly, the motor speed, current draw by the motor, or a combination thereof. The LTV may relate, correlate, and/or determine a current and a voltage measurement to an estimated position of the motor or rotational angle of the motor, motor velocity, current draw by the motor, or a combination thereof. A position of the actuator assembly, the brake piston, or both can be accurately estimated based on the estimated position of the motor, which is the rotational position or angle of the motor. This is because when the output shaft of the motor is rotated, the actuator assembly and thus the brake piston or brake shoe correspondingly move because they are all rigidly connected via one or more geared and/or threaded connections. The displacement or movement of the actuator assembly, the brake piston, or both may be related to the clamp force, which may also be referred to herein as the parking brake force.

During a parking brake apply in a disc brake system, as the nut axially moves towards the bottom of the piston pocket, and the brake pads are moved towards the braking surface or the brake rotor, the parking brake force can be related to the motor position based on a suitable regression model. For example, the model may be a $1^{st}$ order linear regression model, a $2^{nd}$ order polynomial regression, a $3^{rd}$ order regression model, a $4^{th}$ order regression, etc. For example, the parking, brake force can be related to the motor position based on known system stiffness often modeled through use of a $2^{nd}$ polynomial regression. During a parking brake apply in a drum-in-hat brake system that has an internal compliance spring, the parking brake force can be related to the motor position based on a regression model such as a piecewise representation or a lookup table. In either case, a known system stiffness should be defined and analytically represented for relating position of the motor, actuator, and/or brake piston to clamping force or parking brake force.

One or more models or subcomponents may define the LTV. The one or more subcomponents may include a harness subcomponent, a state estimation subcomponent, a force estimation subcomponent, and a feedback linearization subcomponent. It is understood that one or more of the aforementioned subcomponents can be combined and/or cascaded. That is, for example, the force estimation subcomponent can be cascaded into the state estimation subcomponent and defined as a single subcomponent.

Turning now to the figures, FIG. 1 illustrates a brake system 10. The brake system 10 may be used to create a clamping force during a brake apply. The brake apply may be during regular or service braking to slow and/or stop a vehicle or road wheel. The brake apply may be during application of the parking brake to prevent movement of the vehicle or road wheel.

The brake system 10 comprises a brake caliper 12 that is configured to support an inboard brake pad 14 and an outboard brake pad 16. The brake caliper 12 comprises a caliper bore 18 that is configured to support therein a brake piston 20. The brake piston 20 comprises a piston pocket 22.

The brake system 10 comprises an actuator 24. The actuator 24 comprises a spindle 26 and a nut 28. An outer surface of the spindle 26 comprises a threaded portion 30, and an inner surface of the nut 28 comprises a mating threaded portion 32 that is configured to threadably engage the threaded portion 30 of the spindle 26. In some configurations, the actuator 24 may be a ball screw or ball nut assembly that may include ball bearings positioned between the spindle 26 and the nut 28.

The spindle 26 comprises an input portion 34 that is in communication with a motor 36. The motor 36 is configured to generate torque, which is transferred directly to the input portion 34 of the spindle 26, or indirectly to the input portion 34 of the spindle 26 via one or more torque transferring mechanisms, gears, gear trains, or a combination thereof.

Torque acting on the input portion 34 of the spindle 26 may function to cause the spindle 26 to rotate about its longitudinal axis 38 in either an apply direction or a release direction. The nut 28 may be restricted or prevented from rotating about the axis 38. The spindle 26 may be restricted or prevented from axially moving along the axis 38.

A controller 48 may be in communication with the brake system 10 and/or the motor 36. The controller 48 and/or the brake system 10 may be configured to turn the motor 36 ON and turn the motor 36 OFF.

Before, during, or after a brake apply, the controller 48 and/or brake system 10 may be configured to read, monitor, record and/or interpret one or more motor characteristics of the motor 36. The one or more motor characteristics of the motor 36 may include: inrush current or input surge current, motor current, a change in motor current, motor voltage, a change in motor voltage, motor running or operating time, or a combination thereof.

Before, during, or after a brake apply, the controller 48 and/or brake system 10 may be configured to compare the one or more read, monitored, recorded and/or interpreted motor characteristics to one or more preprogramed, predetermined, and/o predefined motor characteristic thresholds, which may be stored in a memory associated with, connected to, and/or part of the brake system 10, controller 48, and/or vehicle system. Before, during, or after a brake apply, the controller 48 and/or brake system 10 may be configured to compare one or more read, monitored, recorded and/or interpreted motor characteristics to one or more motor characteristics that were previously read, monitored, recorded and/or interpreted in, during, or after a previous brake apply.

The brake system 10 and/or controller 48 may be configured to control the motor 36 based on the read, monitored, recorded, interpreted and/or compared motor characteristics. For example, based on the read, monitored, interpreted, recorded, and/or compared motor characteristics, the brake system 10 and/or controller 48 may be configured to turn the motor 36 OFF and/or ON; increase and/or decrease a run time of the motor 46; increase and/or decrease a torque output from the motor 36; increase and/or decrease a speed of the motor 36; or a combination thereof. Controlling the motor 36 in the foregoing ways results in controlling a position of the actuator 24 (i.e., relative position of the nut relative to the spindle).

Before, during, or after a brake apply, the brake system 10 and/or controller 48 may be configured to update, alter, change, verify, and/or modify the one or more preprogramed and/or predetermined motor characteristic thresholds based on a previous or subsequent motor characteristic reading, determination, and/or comparison. This may be desirable so that the motor 36 and/or brake system 10 can continue to efficiently operate over time, even as efficiency and/or components of the motor 36, actuator 24, and/or brake system 10 change due to wear and/or degradation.

The brake system 10 may be used to create a clamping force during a brake apply, which may be during application of the regular or service brake, or application of the parking brake. During the brake apply, the motor 36 is configured to generate torque, which is configured to cause the spindle 26 to rotate in an apply direction (clockwise or counterclockwise) about the longitudinal axis 38, which causes the nut 28 to move axially along the longitudinal axis 38 in an apply direction 50, towards a bottom pocket wall 40 of the piston pocket 22. Eventually, a forward or leading end 42 of the nut 28 will contact the bottom pocket wall 40 of the piston pocket 22. After contact is made between the forward or leading end 42 of the nut 28 and the bottom pocket wall 40 of the piston pocket 22, a gap G1 is defined between an opposing back end 53 (FIG. 3) of the nut 28 or a nut stop 54 and a spindle stop 56. The nut stop 54 may be a finger, or projection that extends from the back end 53 of the nut 28.

After contact is made between the forward or leading end 42 of the nut 28 and the bottom pocket wall 40 of the piston pocket 22, continued rotation of the spindle 26 in the apply direction, and thus continued movement of the nut 28 in the apply direction 50, causes the brake piston 20 to be pushed or moved in the apply direction 50 towards the inboard brake pad 14. Continued movement of the brake piston 20 in the apply direction 50 eventually causes the brake piston 20 to move or push the inboard brake pad 14 against a side of a braking surface to create friction or a clamping force. After contact is made between the inboard brake pad 14 and the braking surface, continued movement of the inboard brake pad 14 against the braking surface causes an opposite reaction force to act on a bridge 44 of the brake caliper 12, which causes one or more fingers 46 of the bridge 44 to pull the outboard brake pad 16 into contact with and against an opposite side of the braking surface to create friction or the clamping force.

Figure 2:
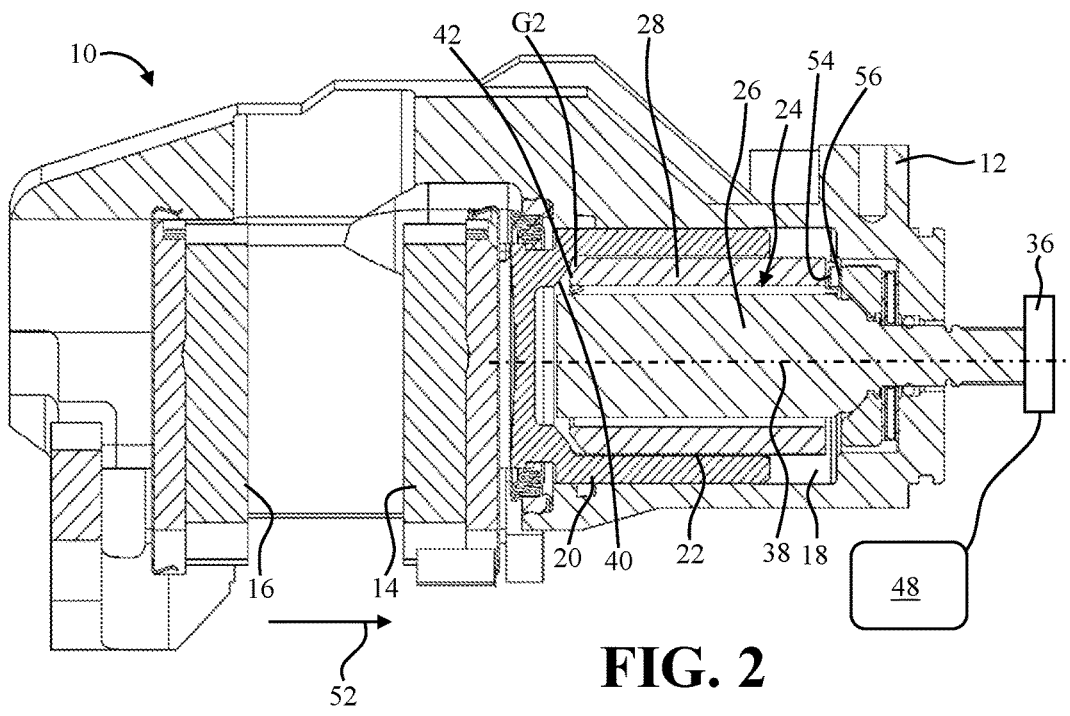
FIG. 2 is a cross-section of a brake system that includes an actuator in a retracted position.

With additional reference to FIG. 2, the brake system 10 can be used to release the clamping force during a brake release, which may release of the regular or service braking, or release of the parking brake. During release, the motor 36 is configured to cause the spindle 26 to rotate about the longitudinal axis 38 in a release direction, which is opposite the direction that the spindle 26 is rotated when the spindle 26 is rotated in the apply direction (i.e., the other of the clockwise or counterclockwise direction).

Rotation of the spindle 26 in the release direction causes the nut 28 to move axially along the longitudinal axis 38 in a release direction 52, or away from the bottom pocket wall 40 of the piston pocket 22 until a gap G2 is defined between the forward or leading end 42 of the nut 28 and the bottom pocket wall 40 of the piston pocket 22. The brake piston 20 can then move back into the caliper bore 18 out of contact with the inboard brake pad 14, thus allowing the brake pads 14, 16 to move out of contact with the braking surface to release the clamping force.

Due to thinning or wear of the lining or friction material of one or both of the brake pads 14, 16 that occurs over time from being pressed against the braking surface, brake rotor, or brake drum, the brake piston 20 moves further out of the caliper bore 22 over time in the apply direction 50. This also means that nut 28 displacement, or the position of the nut 28 on or along a length of the spindle 26 relative to the spindle 26 also increases or changes over time. That is, the gap defined between the rear end 53 of the nut 28 or nut stop 54 and the spindle stop 56 or spindle flange 57 increases over time.

When servicing or replacing worn brake pads 14, 16, the brake piston must be reset, moved, retracted, or pushed back into the caliper bore 22 to accommodate the new brake pads 14, 16. This means that the nut 28 must also be reset, moved, or retracted in a direction towards the spindle stop 56

Resetting the brake piston 20 means moving, pushing, or retracting the brake piston 20 back into the caliper bore 22 in the release direction 52 or in the direction away from the inboard brake pad 14.

Resetting the nut 28 or the actuator 24 or moving the nut 28 or actuator 24 into the retracted position means retracting or moving the nut 28 in the release direction 52 away from the bottom pocket wall 40 of the piston pocket 22. Resetting the nut 28 or the actuator 24 or moving the nut 28 or actuator 24 into the retracted position means retracting or moving the nut 28 in the release direction 52 until a back or rear end 53 of the nut 28 or nut stop 54 contacts the spindle 28 or spindle stop 56 or spindle flange 57. Resetting the nut 28 or the actuator 24 may be accomplished by rotating the spindle 26 in the release direction.

Figure 3:
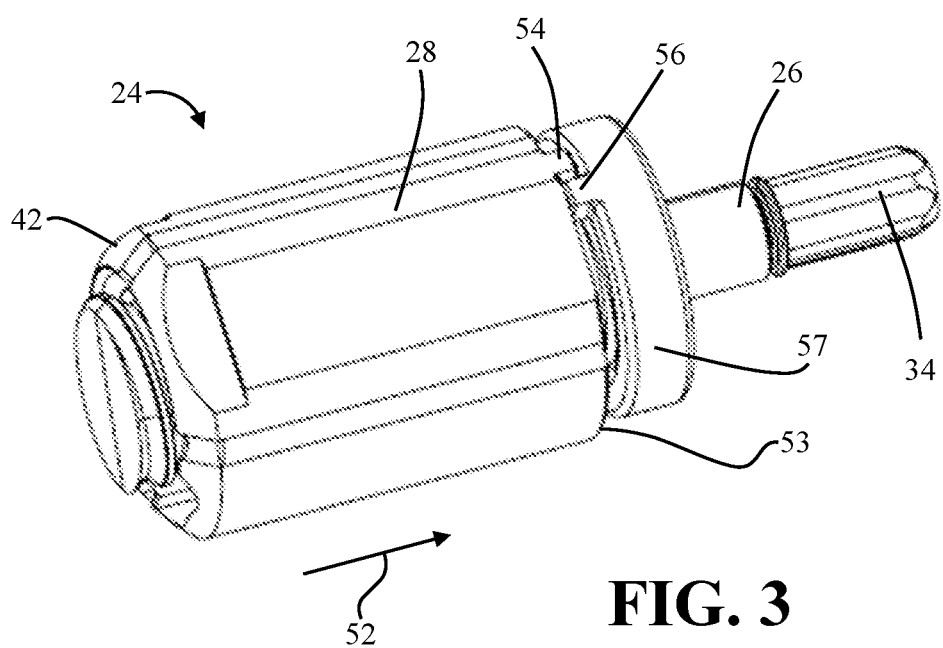
FIG. 3 is a perspective view of an actuator.

FIG. 3 illustrates a perspective view of an actuator 24 in accordance with the present teachings. The actuator 24 may comprise a nut 28 and a spindle 26. The nut 28 comprises a forward or leading end 42 and an opposing rear or trailing end 53. The rear or trailing end 53 may be the nut stop, or the nut stop may be a finger or projection 54 extending from the rear or trailing end 53. The nut stop may be any surface of the nut 28 that first contacts the spindle stop when the nut 28 is moved in the release direction 52 so that further movement of the nut 28 in the release direction 52 is prevented.

The spindle 26 comprises an input portion 34 and an end or flange 57. The end or flange 57 may be a spindle stop, or the spindle stop may be a finger or projection 56 extending from end or flange 57. The spindle stop may be any surface of the spindle 26 that first contacts the nut stop when the nut 28 is moved in the release direction 52 so that further movement of the nut 28 in the release direction 52 is prevented.

The nut 28 or the actuator 24 can be reset or moved into the retracted position by rotating the spindle 26 via the motor 36 (FIGS. 1 and 2) in the release direction. Doing so, causes the nut 28 to move axially in the release direction 52 until the nut stop 54 comes into contact with the spindle stop 56. During this movement, one or more motor characteristics of the motor 36 can be read, monitored, evaluated, recorded, processed, and/or compared by the brake system 10 and/or controller 48.

During retracting of the actuator 24, it may be desirable to know if and/or when the nut 28 or nut stop 54 contacts the spindle 26 or spindle stop 56 and/or when the nut 28 is in the retracted position so that torque supply from the motor 36 to the spindle 26 can be discontinued at that time. If, for example, the motor 36 continues to supply torque to the spindle 26 after the nut 28 or nut stop 54 contacts the spindle 26 or spindle stop 56, damage may occur to the motor 36, actuator 24, spindle 26, nut 28, brake piston 20 and/or brake system 10. Therefore, it may be desirable to know as soon as the nut stop 54 contacts the spindle stop 56, or shortly thereafter so that the brake system 10, controller 48, and/or motor 36 can respond accordingly by stopping the motor 36 for example.

Figure 4:
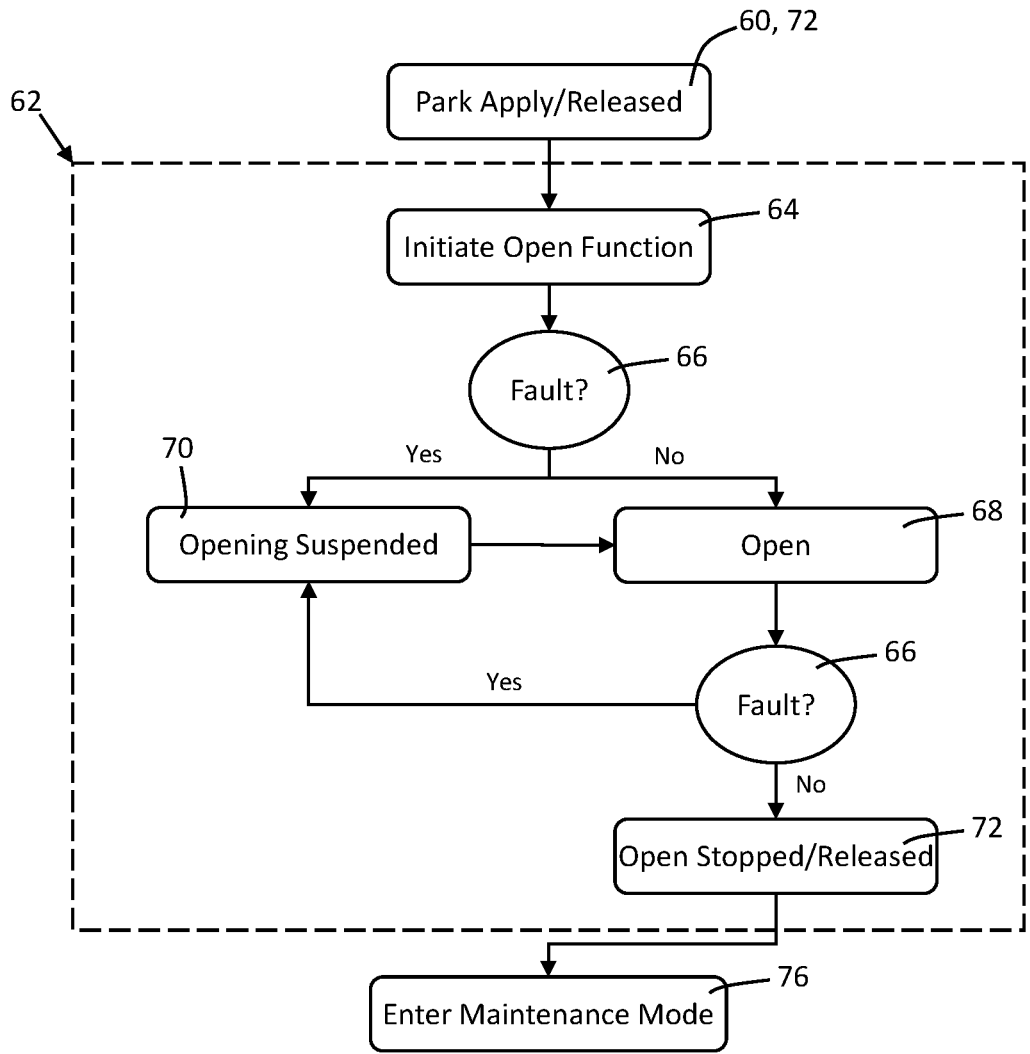
FIG. 4 is a partial flowchart illustrating a method of servicing a brake system.

FIG. 4 illustrates a partial flowchart illustrating a method of servicing a brake system as described herein. It is envisioned that servicing of the brake system may include, but is not limited to, any maintenance tasks, such as brake pad replacement, brake system repair, other types or repair, or any servicing that requires interaction from a service provider. To begin servicing of the brake system, it is first ensured that the parking brake (e.g., the electronic park brake) is applied 60 or released 72. Once the brake system or controller thereof determined that the parking brake has been applied and the vehicle is stationary, a user such as a vehicle owner or a service technician may initiate an open function 64 to move the brake piston, brake pads, brake caliper, or a combination thereof to an open position. The open position may be an intermediate position that facilitates releasing of brake pads and/or a brake piston to a fully released position. For example, the open position may be a position of the actuator within the brake system that may not hinder or otherwise prevent release of the brake pads, the brake piston, or both. It is envisioned that the open function 62 may be initiated via a human-machine interface (HMI) within the vehicle or elsewhere.

Once the open function 64 has been initiated, the system may conduct a fault check 66 to determine if any fault exists within the brake system. The fault check 66 may check for any fault that may prevent the brake system from actuating to an open position. The fault check 66 may also check for any fault that may result in the brake system no longer being operational after further articulation. If a fault is found during the initiate open function 64 prior to opening, the brake system may suspend the opening 70 (e.g., actuation) of the actuator. Suspension of the open function 62 may allow for a defined duration of time to resolve the fault. The brake system or controller of the brake system may maintain a count to determine the duration of time elapsed in the opening suspended 70 state. However, opening may also be suspended indefinitely until manual interaction by a user resets the command or manual resolves the fault.

After the fault has been resolved when in the opening suspended state 70 or if no fault 66 is detected to hinder initiating the open function 64, the actuator is actuated to move to an open position 68 as discussed above. During the actuation of the actuator to move to the open position 68, the brake system or a controller thereof may conduct an active fault check 66 to determine if the brake system presents any fault while operating to the open position 68. If a fault is detected during this second fault check 66, the opening actuation is suspended 70 until the fault is resolved or a user manually interacts with the brake system. If a fault is not detected, the brake system or a controller thereof may stop actuation of the actuator and maintain the open position in an "open stopped" state 72. The open stopped state 72 (i.e. a released state) may be defined as a static position of one or more components of the brake system, such as the actuator, and may be verified via the brake system. The open stopped position 72 may also be determined using one or more estimation values calculated by a controller of the brake system.

It should also be noted that one or more additional states may exist and/or be maintained by the brake system or a controller thereof during the open function 62. For example, the open function 62 may include an opening state 68 as discussed above when the actuator is dynamically moving to the opened position along with a static open stopped position 72 when the actuator reaches the open position. However, the brake system may also include an intermediate position to define when the actuator is in the process of stopping and nearing the open position. As such, the various states of the brake system or one or more components therein may beneficially allow the brake system or a controller thereof to restrict and/or allow access to one or more actions.

When the actuator successfully reaches the open stopped 72 position, the brake system or a controller thereof may complete operation of the open function 62 and enter into a maintenance mode 76 of the brake system. Similar to initiating the open function 62, a user (e.g., a vehicle owner or service technician) may manually send a request from an HMI to the controller of the brake system via host software connecting communication between the various components.

Figure 5:
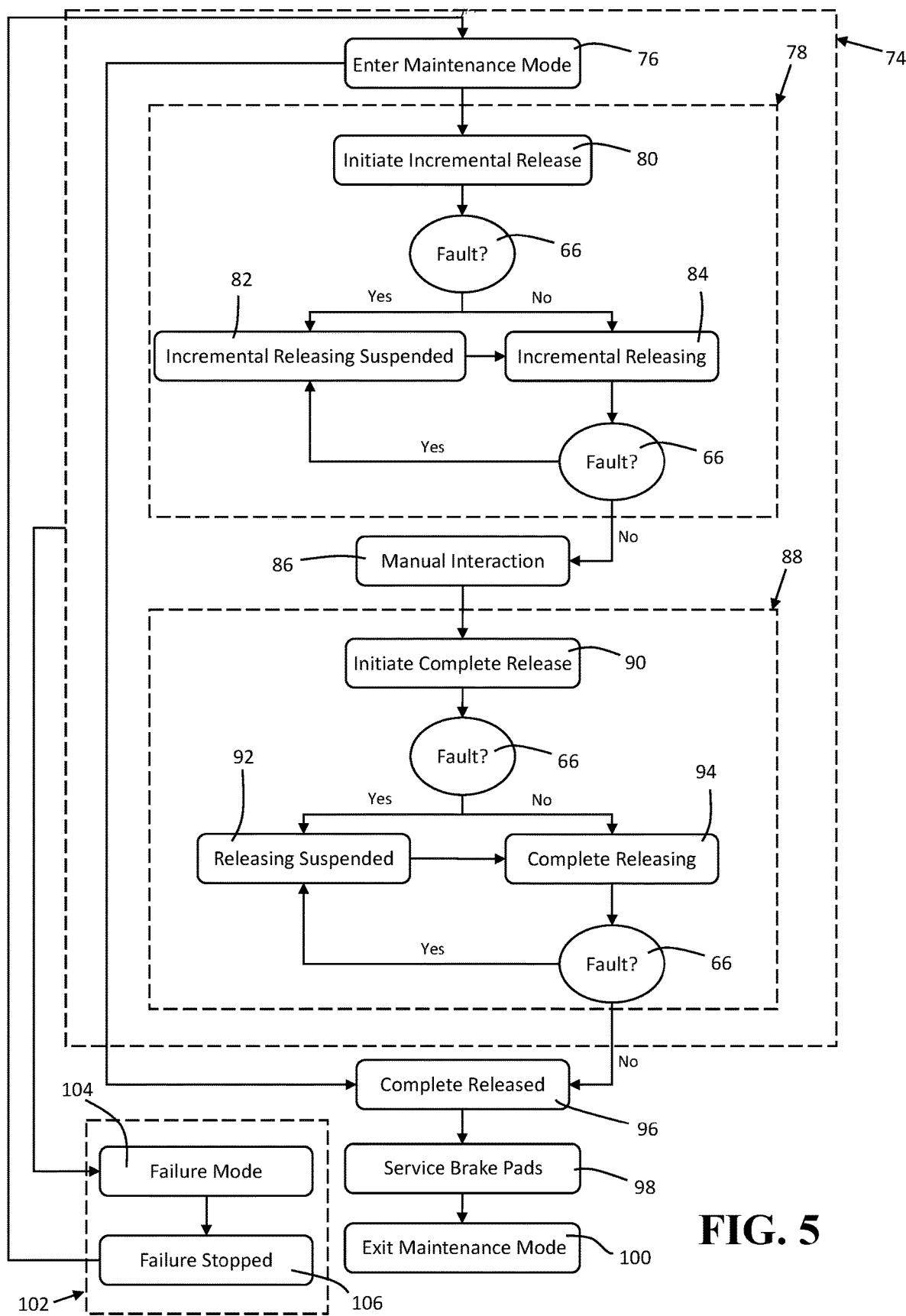
FIG. 5 is a continuation of the partial flowchart of FIG. 4 illustrating a method of servicing a brake system.

Reference now will be made more specifically to FIG. 5, which is a continuation of the method described in FIG. 4 once the brake system has entered into an overall maintenance mode 74. The maintenance mode 74 may be configured to maintain a position and/or state of the brake system while a service technician conducts maintenance on the brake system. The maintenance mode 74 may include one or more sub-functions in its routine to move the brake system or a component therein (e.g., the actuator) to a desired position. For example, as shown in FIG. 5, the maintenance mode 74 may include both an incremental release function 78 and a complete release function 88. The incremental release function 78 and the complete release function 88 may aid in moving the brake system (e.g., brake pads, brake piston, actuator, brake caliper, or a combination thereof) to a complete released position 96. The complete released position 96 may be defined as a position of the brake system in which there is sufficient clearance to replace or otherwise access worn brake pads or brake linings of the brake system.

To reach the complete released position 96, the brake system enters the maintenance mode 76 as described above. Once the maintenance mode has been entered 76, the system may verify a position of the brake system based on one or more parameters (e.g., current, voltage, etc.) to determine if the brake system is already in the complete released position 96. If the position verification process determines that the brake system is not in a complete released position 96, the brake system may continue through the maintenance mode 74 and initiate the incremental release function 80. After initiation of the incremental release function 80, the brake system or a controller thereof may conduct a fault check 66 to determine if any fault exists within the brake system. The fault check 66 of the incremental release function 80 may check for the same or different faults than the fault checks 66 of the open function 62, fault checks 66 of the complete release function 88, or both. As such, the fault check 66 may beneficially be adapted to check for specific faults during different functions or may generally detect any overarching or general faults.

If the fault check 66 of the incremental release function 78 detects a fault that may prevent or otherwise impede initiating movement of the brake system during the incremental release function 78, the brake system or a controller thereof may suspend incremental release 82 (e.g., suspend actuation) of the brake system (e.g., actuator). Similar to the open function 62 discussed above, the suspension of the incremental release 82 may allow for a defined duration of time to resolve the fault or may be suspended indefinitely until manual interaction by a user resets the system.

After the fault has been resolved when in the incremental releasing suspended state 82, or if no fault 66 is detected to hinder initiating the incremental release function 80, the actuator may be actuated to move to an incremental released position. It is envisioned that the incremental released position may be an intermediate position between the open position (i.e., reached at the open stopped state 72) and the complete released 96 position. The incremental released position may beneficially be a position where a nut of the actuator is at least partially retracted, yet still in contact with the brake piston. In this manner, the brake system may advantageously use a position estimation to determine such an incremental release position and halt further release of the actuator once the incremental release position is reached. As a result, disengagement of the brake piston and the actuator nut are prevented, which may often be the failure mode of a conventional brake system that continues to a complete released position 96 without first stopping at an incremental released position 84. Such a disengagement may often result in a non-functional state in which the piston and/or actuator nut can no longer be retracted. It should also be noted that during the incremental releasing 84, a second active fault check 66 may be conducted to determine if the brake system presents any fault while operating to the incremental released position 84. If a fault is detected, the incremental release may be suspended 82 as described above. If a fault is not detected, the incremental release may continue until the actuator reaches the incremental released position.

To ensure disengagement between the actuator nut and the brake piston does not occur throughout the remaining release of the brake system, manual interaction 86 may be required after the actuator reaches the incremental released position. It is envisioned that manual interaction 86 may be any interaction from a user such as a service technician. Beneficially, the manual interaction 86 may prevent a non-functional state between the brake piston and the actuator nut. For example, when the actuator reaches the incremental released state, the manual interaction 86 may include a service technician physically retracting the brake piston. The physical retracting of the brake piston may reset a position of the brake piston to ensure that contact continues to exist between the brake piston and the actuator, thereby preventing disengagement. The physical retraction of the brake piston may include retracting the actuator along with the brake piston. For example, if the incremental release position reached by the actuator maintains contact between the brake piston and the actuator, manual resetting (i.e., retracting) of the brake piston will also manually reset the actuator since both the brake piston and the actuator may be moved in unison.

It should also be noted that other manual interaction 86 may occur beyond the piston resetting as discussed above. The manual interaction 86 may include any physical or electronic interaction from a service technician or other user within the brake system or a system connected to the brake system. Physical interaction may include adjustment of one or more components of the brake system other than the brake piston, such as the brake linings, retainer clips, springs, caliper, or a combination thereof. Electronic interaction may include manual interaction by a user to reset one or more electronic systems, one or more monitored parameters (e.g., a reset of one or more metrics being monitored for position estimation), or both. Manual interaction 86 may also include both physical and electronic manual interaction by the user. For example, a service technician may first manual reset the position of the brake piston and/or the actuator. After completion of the reset, the service technician may need to confirm via the HMI that the manual reset has been completed before the brake system or a controller thereof progresses to the next step of the method. Thus, it may be gleaned from the present teachings that the method of service described herein beneficially provides an opportunity for a user to manual interact 86 with the brake system in any necessary or desired way to ensure substantially continuous engagement between the brake piston and the actuator.

Once manual interaction 86 has been completed, the brake system or a controller thereof may initiate complete release 90 of the actuator and/or brake caliper. As described above, the complete release function 88 may be started by a user interacting with an HMI connected to the brake system to confirm the initiation of the complete release 90. Alternatively, once manual interaction 86 has been completed or confirmed via the user, complete release may automatically be initiated. Once the complete release function has been initiated 90, the system may conduct a fault check 66 to determine if any fault exists within the brake system that may prohibit complete release. The fault check 66 may occur prior to articulation of the brake system to ensure that the brake system is fully capable of moving to the complete released position. As described above, the fault check 66 may check for any fault that may result in the brake system no longer being operational or any other desired fault.

If a fault is found, the brake system or a controller thereof may suspend the complete releasing 92 until the fault is resolved. In this particular instance, complete releasing 92 may be analogous to preventing any movement of the brake piston and/or actuator beyond the position reached after manual interaction 86. For example, after initiation of the complete release 90 is requested, the fault check 66 will be conducted prior to any articulation of the brake system. As such, if a fault is found, damage to the brake system or a non-functional state of the brake may be proactively prevented prior to beginning the complete release movement.

After complete release has been suspended 92, the complete release function 88 may allow for a defined duration of time to resolve the fault, may require manual interaction with the brake system or a controller thereof to reset the fault, or both. Once the fault has been resolved or if no fault is found, complete releasing 94 may be initiated to move the brake piston and/or actuator to the complete released 96 position. The complete released position 96 may be reached by moving the actuator to its mechanical limit which allows a brake caliper of the brake system to fully open. The mechanical limit of the actuator may be an open-most position of the actuator the provide the greatest amount of access space for a service technician to manually service one or more brake pads of the brake system or otherwise manually interact with the brake system. Thus, the actuator (and thus the brake piston) may reach the complete release position 96 when the actuator may no longer move in a release direction (i.e., a direction moving away from a rotor and/or brake disk of a vehicle).

During the complete releasing 94 and prior to reaching the complete released position 96, a second fault check 66 may be conducted. The fault check 66 may continuously or incrementally monitor the complete releasing 94 to check if any fault may occur that prevents the actuator from reaching the complete released position 96. The fault check 66 may monitor one or more parameters of the brake system (e.g., voltage, current, time, etc.) to determine a fault during actuation. If a fault is found, the complete releasing is suspended 92 until resolution.

If no fault is found, actuation of the actuator may stop once the actuator reaches the complete released position 96. As described above, the brake system or a controller thereof may calculate position estimation based upon one or more tracked values of the brake system. For example, the complete released position 96 may be determined based upon a motor current of the brake system. A high current spike may exist when the actuator reaches its final stop at the complete released position 96. Therefore, the average motor current may then exceed a current threshold to communicate to the controller of the brake system that the complete releasing 94 has been completed and the actuator is in the complete released position 96. However, it should be noted that any desired parameters or calculations may be utilized to determine the position of the actuator.

Once the actuator reaches the complete released position 96, a service technician may be able to access the brake linings (e.g., brake pads) for service 98. Servicing may also include any other operations necessary to check and/or resolve any issues with the brake system. The brake system may maintain the complete released position 96 until the service 98 is completed and/or the service technician (or other user) communicates to the brake system controller that service has been completed. For example, the service technician may communicate through an HMI connected to the brake system that service is complete, thereby exiting the maintenance mode 100.

Once maintenance mode has been exited 100, the brake system may apply a force (e.g., move the actuator and brake piston in a clamping direction) to reset the brake system back to a running position. Such a position may be determined based upon a position estimation as described above.

It should be noted that one or more functions within the system may not be necessary for every brake system. For example, the brake system may go directly from a park applied position 60 to the incremental release function 78 without completing the open function and/or reaching the open stopped position 72. Thus, it may be gleaned from the present teachings that the method may be advantageously determine various conditions of a brake system to robustly apply the method described herein to reach a complete released position while still preventing disengagement between the brake piston and the actuator.

As described above, one or more of the functions may include a fault check 66 to determine if any fault exists that may prevent or otherwise impact operation of the brake system. When a fault is found, the brake system may enter initially determine that a temporary failure is present, thereby triggering the function to be suspended (70, 82, 92). While the suspension may go indefinitely until a user interacts with the system, the brake system or a controller thereof may monitor the duration of time while in the suspended state. If fault is not recovered with a certain duration of time, the temporary failure may time out, thereby moving the state of the brake system from the suspended state to fault detection 102. The brake system may enter the fault detection 102 from the suspended state as a failure mode 104. When entering the failure mode state 104, the brake system or a controller thereof may monitor one or more parameters of the brake system to determine if the brake system is still moving or if the system is in a failure stopped position 106. Once in the fault detection 102, a service technician or other user may resolve the failure mode. When the failure mode is resolved, the brake system may then exit the fault detection and enter back into the maintenance mode 74. The brake system state may be moved from the fault detection 102 to the maintenance mode 74 via manual resetting (e.g., using the HMI) or automatically based upon brake system parameters being monitored.

Figure 6:
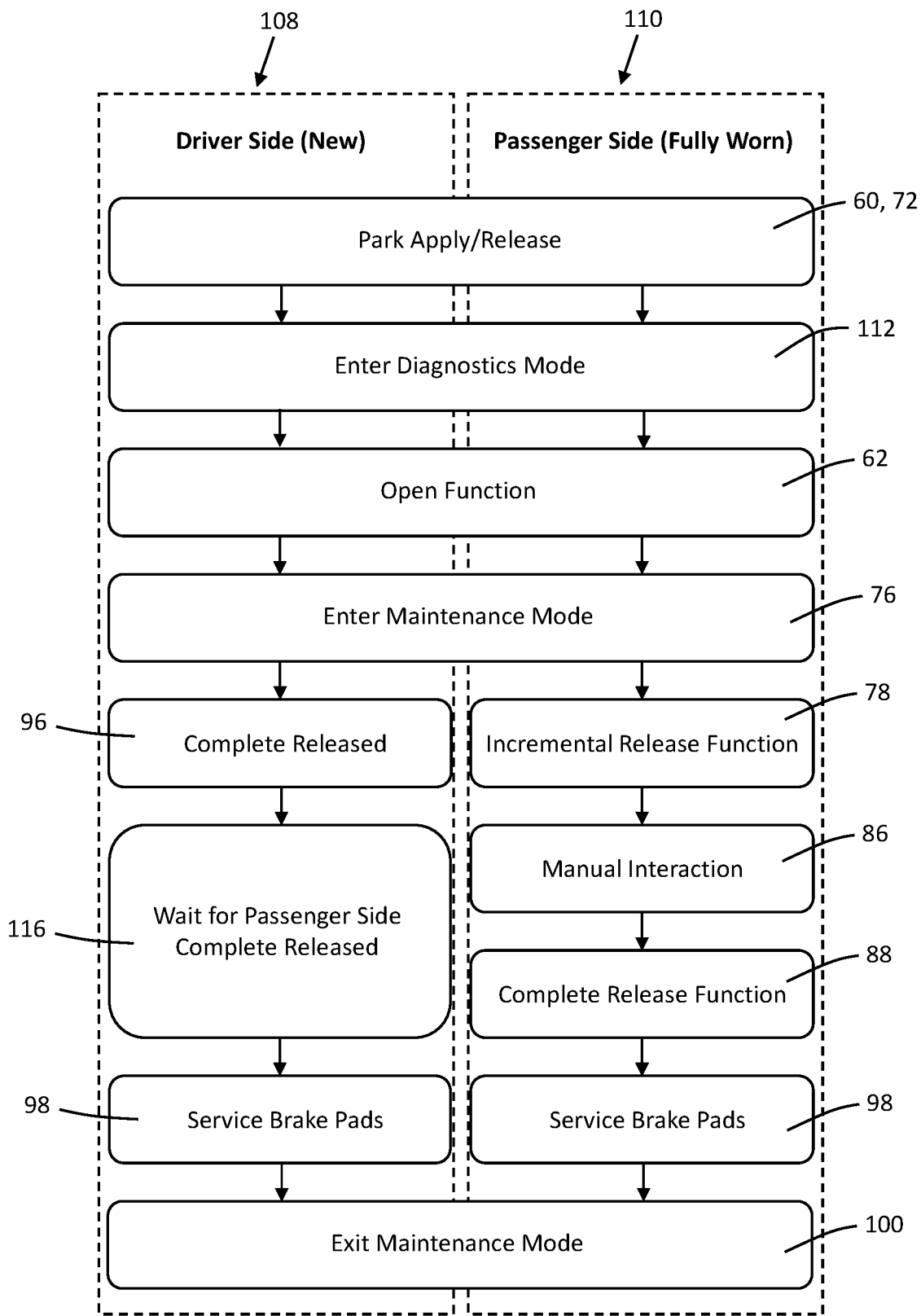
FIG. 6 is a flowchart illustrating a method of servicing a coupled brake system.

Reference will now be made more specifically to FIG. 6, which illustrates a method of servicing a brake system as described herein for a coupled brake system. In a coupled brake system, a driver side 108 and a passenger side 110 may each include their own system structure, thereby requiring dependent operation between the driver side 108 and the passenger side 110. In this particular example, the driver side 108 may include one or more brake assemblies with new brake pads while the passenger side 110 includes one or more brake assemblies with fully worn brake pads.

As described above in reference to FIG. 5, both the driver side 108 and the passenger 110 may initially ensure a parking brake is applied 60 or released 72. Once the parking brake has been applied 60, a user may enter diagnostics mode 112 by communicating with the brake system via an HMI within the vehicle. Once in diagnostics mode 112, both the driver side 108 and the passenger side 110 may complete an open function (see FIG. 5) to move the actuator and brake piston of each side to an open stopped position. Once the open stopped position has been reached, both the driver side 108 and the passenger 110 may enter maintenance mode 76.

When the brake system is in maintenance mode 76, release of the actuators within the brake system may be initiated. At this point, the brake system or a controller thereof may use position estimation to determine the position of the actuators in both the driver side 108 and the passenger side 110. Here, since the driver side 108 has new brake pads within the one or more brake assemblies, the driver side 108 may start in the complete released 96 position after initiating the open function 62 and entering maintenance mode 76.

However, the passenger side 110 brake pads are fully worn, and thus the passenger side 110 may enter and complete an incremental release function 78 (see FIG. 5). After reaching the incremental release position, manual interaction 86 (e.g., physical resetting of the brake piston and/or actuator) may be conducted prior to entering and completing the complete release function 88. During this time, the driver side 108 may be in an idle mode 116 waiting for the passenger side to reach a complete released position 96.

Once the passenger side 110 reaches the complete released position, both the driver side 108 and passenger side 110 may be serviced 98. After service 98 is completed on the driver side 108 and the passenger side 110, the brake system may exit maintenance mode 100 and reapply a clamping force to move the brake assemblies back to a running and/or braking position.

Figure 7:
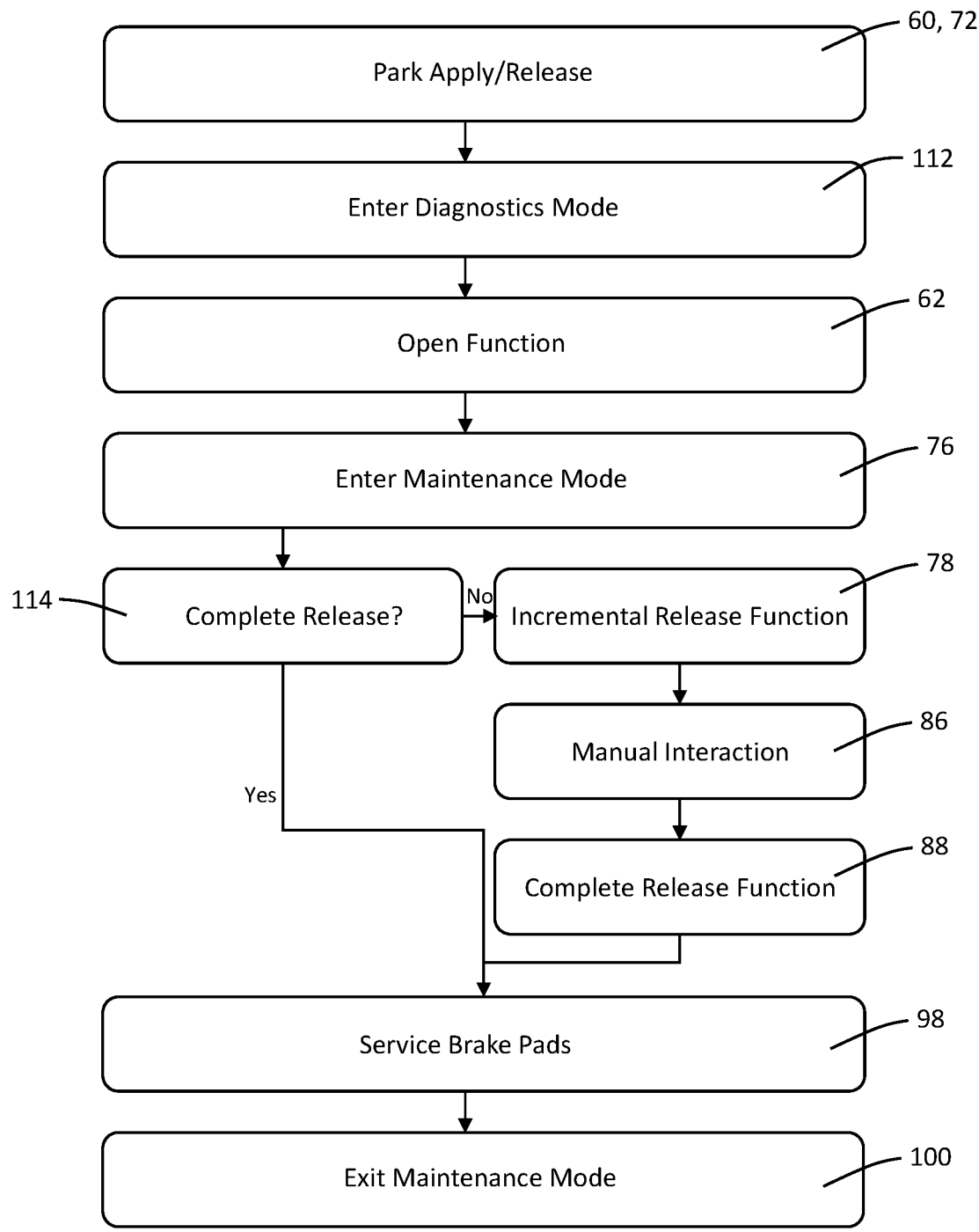
FIG. 7 is a flowchart illustrating a method of servicing a decoupled brake system.

FIG. 7 illustrates a similar method of servicing a brake system, except that the brake system shown therein is a decoupled brake system instead of a coupled brake system. In a decouple brake system, each brake assembly (e.g., brake caliper), regardless of position on the driver side or passenger side, shares identical software and may be operated independently within the method described. As such, each brake assembly may complete the method described below without being dependent on a state of any other brake assembly within the brake system.

Similar to FIG. 6, the brake system may first ensure the parking brake has been applied 60 or released 72 before enter diagnostics mode 112. Once in diagnostics mode 112, each brake assembly within the brake system may enter and complete an open function 62 to reach an open stopped position (see FIG. 5), thereby allowing the brake system to enter maintenance mode 76. It should however be noted that any method described herein may move the brake system directly from the park applied 60 to enter maintenance mode 76 without completing the open function 62.

Once in the maintenance mode 76, a complete release check 114 may be conducted by the brake system or a controller thereof to determine if the brake assemblies have already reached the complete released position. If the complete released position has not been reached, the brake assemblies may enter and complete an incremental release function 78 (see FIG. 5). Once an incremental release position is reached, manual interaction 86 may occur prior to the brake assemblies entering and completing the complete release function 88 to reach the complete released position. Conversely, if the complete release check 114 determines that the brake assemblies are already in the complete released position, the incremental release function 78, manual interaction 86, and the complete release function 88 may all be bypassed.

As illustrated above in reference to FIG. 7, each brake assembly may complete the method to reach the complete released position free of dependency on any other brake assembly within the brake system. Thus, a first brake assembly may move directly to the complete released position for service while a second brake assembly requires completion of the incremental release function 78, manual interaction 86, and the complete release function 88. As such, each brake assembly may beneficially not require a waiting or idle time to wait for operation of any other brake assemblies within the brake system.

Once the brake assemblies reach the complete released position, service may be conducted 98 on the brake assemblies, such a replacement of worn brake pads, service of one or more additional components of the brake assemblies, or a combination thereof. After service has been completed, maintenance mode may be exited 100—based upon some interaction by the technician or user—and a force may again be applied to the brake assemblies to bring the brake assemblies back to a running position or stopped position.

ELEMENT LIST

- 10 Brake System
- 12 Brake Caliper
- 14 Inboard Brake Pad
- 16 Outboard Brake Pad
- 18 Caliper Bore
- 20 Brake Piston
- 22 Piston Pocket
- 24 Actuator
- 26 Spindle
- 28 Nut
- 30 Threaded Portion
- 32 Mating Threaded Portion
- 34 Input Portion
- 36 Motor
- 38 Longitudinal Axis of the Spindle
- 40 Bottom Pocket Wall
- 42 Leading End of the Nut
- 44 Bridge
- 46 Finger
- 48 Controller
- 50 Apply Direction
- 52 Release Direction
- 53 Back End of the Nut
- 54 Nut Stop
- 56 Spindle Stop
- 57 Spindle Flange
- 60 Park Apply
- 62 Open Function
- 64 Initiate Open Function
- 66 Fault Check
- 68 Open
- 70 Opening Suspended
- 72 Open Stopped/Released
- 74 Maintenance Mode
- 76 Enter Maintenance Mode
- 78 Incremental Release Function
- 80 Initiate Incremental Release
- 82 Incremental Releasing Suspended
- 84 Incrementally Releasing
- 86 Manual Interaction
- 88 Complete Release Function
- 90 Initiate Complete Release
- 92 Releasing Suspended
- 94 Complete Releasing
- 96 Complete Released
- 98 Service Brake Pads
- 100 Exit Maintenance Mode
- 102 Fault Detection
- 104 Failure Mode
- 106 Failure Stopped
- 108 Driver Side Caliper
- 110 Passenger Side Caliper
- 112 Enter Diagnostics Mode
- 114 Complete Release Check
- 116 Wait for Complete Release
- G1 Gap
- G2 Gap The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

What is claimed is:

1. A method of servicing a brake system, comprising:
    (a) moving an actuator of the brake system from a first position to a second position;
    (b) conducting a manual operation on the brake system when or after the actuator reaches the second position;
    (c) after completing the manual operation, moving the actuator to a third position; and
    wherein the second position is a position of the actuator located between the first position and the third position.

2. The method of claim 1, wherein in the first position one or more brake pads of the brake system are free of contact with a rotor of a vehicle.

3. The method of claim 1, wherein in the first position one or more brake pads of the brake system are in contact with a rotor of a vehicle.

4. The method of claim 1, wherein the manual operation comprises manually retracting a brake piston into a caliper bore.

5. The method of claim 4, wherein the actuator is stationary during the manual operation.

6. The method of claim 4, wherein the brake piston remains stationary during step (c).

7. The method of claim 1, wherein step (a) is manually initiated by a user.

8. The method of claim 1, wherein the actuator is moved with an electric motor during steps (a) and/or (c).

9. The method of claim 1, wherein the actuator comprises a spindle and a nut or a ball screw, and the third position is when the nut contacts a spindle stop of the spindle.

10. The method of claim 9, wherein the nut is free of contact with the spindle stop in the second position.

11. The method of claim 9, wherein the third position is when the nut is moved farther away from a brake piston than when the nut is in the second position.

12. The method of claim 1, wherein during step (a), one or more components of the actuator are moved away from a brake piston of the brake system.

13. The method of claim 1, wherein the third position is farther away from the first position than the second position.

14. The method of claim 1, further comprising a step of inspecting, replacing, or both one or more brake pads of the brake system.

15. The method of claim 1, wherein the method comprises a step of monitoring the brake system during the servicing for a fault.

16. The method of claim 1, further comprising:
    (d) after moving the actuator to the third position, moving the actuator back to the first position, a brake position where one or more brake pads of the brake system are in contact with a rotor of a vehicle, or both.

17. A method of servicing a brake system, comprising:
    (a) moving an actuator of the brake system from a first position to a second position;
    (b) upon indication of the actuator moving to the second position, manually retracting a piston of the brake system in a caliper bore;
    (c) after the manually retracting step, moving the actuator to a third position farther away from the first position than the second position; and
    (d) moving the actuator from the third position to a parked position, whereby one or more brake pads of the brake system are in contact with a rotor of a vehicle;
    wherein fault detection is conducted during steps (a)-(d).

18. The method of claim 17, wherein the first position is the parked position.

19. The method of claim 17, wherein inspection or replacement of the one or more brake pads is completed after step (c), but before step (d).

* * * * *